United States Patent
Smith et al.

(10) Patent No.: US 10,354,056 B2
(45) Date of Patent: *Jul. 16, 2019

(54) CORRELATED DISPLAY OF BIOMETRIC IDENTITY, FEEDBACK AND USER INTERACTION STATE

(71) Applicant: Microsoft Technology Licensing, LLC, Redmond, WA (US)

(72) Inventors: Robert Mitchell Smith, Seattle, WA (US); Emily M. Yang, Seattle, WA (US); Joseph Wheeler, Sammamish, WA (US); Sergio Paolantonio, Seattle, WA (US); Xiaoji Chen, Seattle, WA (US); Eric C. Sanderson, Redmond, WA (US); Calvin Kent Carter, Seattle, WA (US); Christian Klein, Duvall, WA (US); Mark D. Schwesinger, Bellevue, WA (US); Rita A. Yu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 217 days.

This patent is subject to a terminal disclaimer.

(21) Appl. No.: 15/368,364

(22) Filed: Dec. 2, 2016

(65) Prior Publication Data

US 2017/0083696 A1 Mar. 23, 2017

Related U.S. Application Data

(63) Continuation of application No. 14/279,819, filed on May 16, 2014, now Pat. No. 9,542,544.

(Continued)

(51) Int. Cl.
*G06F 21/32* (2013.01)
*G06K 9/00* (2006.01)

(52) U.S. Cl.
CPC ......... *G06F 21/32* (2013.01); *G06K 9/00221* (2013.01); *G06K 9/00255* (2013.01)

(58) Field of Classification Search
CPC ........ G06F 21/31; G06F 21/575; G06F 21/83; G06F 21/34; G06F 21/36
See application file for complete search history.

(56) References Cited

U.S. PATENT DOCUMENTS 9,542,544 B2 * 1/2017 Smith ..................... G06F 21/32
2002/0019918 A1 2/2002 Ryan et al.
(Continued)

FOREIGN PATENT DOCUMENTS

CN 101925915 A 12/2010
CN 102375681 A 3/2012
(Continued)

OTHER PUBLICATIONS

"International Search Report and Written Opinion Issued in PCT Application No. PCT/US2014/064485", dated Feb. 13, 2015, 9 pages.
(Continued)

*Primary Examiner* — Baotran N To

(57) ABSTRACT

Aspects of the subject disclosure are directed towards providing feedback to users of multi-user system that has biometric recognition capabilities, so that a user knows whether the system has correctly associated the user with his or her identity. The feedback may include a display of a current camera view, along with visible identity information that is associated with each user in the view. The feedback may include per-user icons (e.g., tiles, thumbnail images and so on) by which a user visually confirms that he or she is correctly recognized. Any misrecognition may be detected
(Continued)

via the feedback and corrected. Feedback may convey other information, such as the current interaction state/capabilities of a user.

20 Claims, 9 Drawing Sheets

Related U.S. Application Data

(60) Provisional application No. 61/902,141, filed on Nov. 8, 2013.

(56) References Cited

U.S. PATENT DOCUMENTS

| | | |
|---|---|---|
| 2002/0199188 A1 | 12/2002 | Sie et al. |
| 2009/0133051 A1 | 5/2009 | Hildreth |
| 2010/0277411 A1* | 11/2010 | Yee .................. G06F 3/017 345/156 |
| 2012/0042246 A1* | 2/2012 | Schwesinger .......... G06F 3/017 715/716 |
| 2012/0044136 A1 | 2/2012 | Kim et al. |
| 2012/0167127 A1 | 6/2012 | Uchida et al. |
| 2012/0257797 A1 | 10/2012 | Leyvand et al. |

FOREIGN PATENT DOCUMENTS

| | | |
|---|---|---|
| EP | 2469843 A1 | 6/2012 |
| JP | 2008309379 A | 12/2008 |
| JP | 2011505618 A | 2/2011 |

OTHER PUBLICATIONS

"Second Written Opinion Issued in PCT Application No. PCT/US2014/064485", dated Sep. 21, 2015, 6 pages.

"International Preliminary Report on Patentability Issued in PCT Application No. PCT/US2014/064485", dated Feb. 18, 2016, 7 pages.

"Non-Final Office Action Issued in U.S. Appl. No. 14/279,819", dated Jul. 6, 2015, 12 pages.

"Final Office Action Issued in U.S. Appl. No. 14/279,819", dated Dec. 21, 2015, 13 pages.

"Non-Final Office Action Issued in U.S. Appl. No. 14/279,819", dated May 6, 2016, 12 pages.

"Notice of Allowance Issued in U.S. Appl. No. 14/279,819", dated Sep. 1, 2016, 7 pages.

"Office Action Issued in Mexican Patent Application No. MX/a/2016/006005", dated Aug. 17, 2017, 4 Pages.

"Office Action Issued in Chinese Patent Application No. 201480061329.7", dated Aug. 31, 2018, 15 Pages.

"Office Action Issued in Japanese Patent Application No. 2016-526326", dated Jul. 2, 2018, 3 Pages.

"Office Action Issued in European Patent Application No. 14802768.3", dated Feb. 21, 2019, 5 Pages.

"Office Action Issued in Japanese Patent Application No. 2016-526326", dated Jan. 21, 2019, 5 Pages.

* cited by examiner

CORRELATED DISPLAY OF BIOMETRIC IDENTITY, FEEDBACK AND USER INTERACTION STATE

CROSS-REFERENCE TO RELATED APPLICATION

The present application is a continuation of U.S. application Ser. No. 14/279,819 filed on May 16, 2014, which claims priority to U.S. Provisional Application No. 61/902,141 filed on Nov. 8, 2013. Both applications are hereby incorporated by reference herein for all intents and purposes.

BACKGROUND

Some contemporary computer-based systems provide for some form of biometric identification. For example, some laptop computers and mobile telephones allow a user to sign in with a fingerprint. If the user's fingerprint is not recognized, the user can try again. This is a one-time sign in, after which all actions are attributed to the authenticated user.

In a dynamic multi-user system with biometric identification, such as a contemporary gaming console or digital advertising billboard, users are biometrically identified (via a face scan for example) during their interactions with the system. After a user is biometrically identified, that user's actions, such as launching an application or placing a phone call, are made on the identified user's behalf However, in a dynamic multi-user system, misrecognition in which a user is determined to be someone else is a possibility. As any actions thereafter are specific to a user, incorrect recognition may have significant consequences. For example, a user wants a phone call (e.g., via Skype®) to correctly identify him or her as the caller, wants a product purchased online correctly delivered to his or her address and not someone else's address, wants his or her applications and related data available only to him or her and not someone else, and so on. Even if correctly identified at first, a user is not necessarily identified only once, because for example the user may move in and out of the camera's view; the user may be re-identified in a generally continuous and regularly occurring identification process, providing more chances for misrecognition.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards providing feedback in a multi-user system with biometric recognition capabilities so that a user knows whether the system has correctly associated the user with his or her identity. One or more aspects are directed towards receiving identity data corresponding to recognition of a user as determined by biometric recognition, and associating the identity data with the user. Based upon the identity data, feedback is output (to an output device) that indicates that a recognized identity is associated with the user, including feedback that indicates that the user is capable of interacting with a system that is coupled to or incorporates the output device.

One or more aspects are directed towards a user interface component configured to receive identification data of one or more biometrically recognized users. For each biometrically recognized user, the user interface component outputs feedback, including feedback indicative of an identity of that user based upon the identification data, and feedback indicative of an interaction state (e.g., engagement) of the user.

One or more aspects are directed towards processing an image for detection and biometric recognition of one or more persons therein to attempt to recognize each person. A recognized person has identity data associated therewith, and is signed into a system based on the identity data. Feedback data is also obtained based upon the identity data, including feedback data for rendering as a visible representation of the recognized person. The feedback data is output for rendering as a visible representation of the recognized person on a display device coupled to or incorporated into the system, including rendering feedback data that indicates the recognized person is signed into the system.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Figure 1:
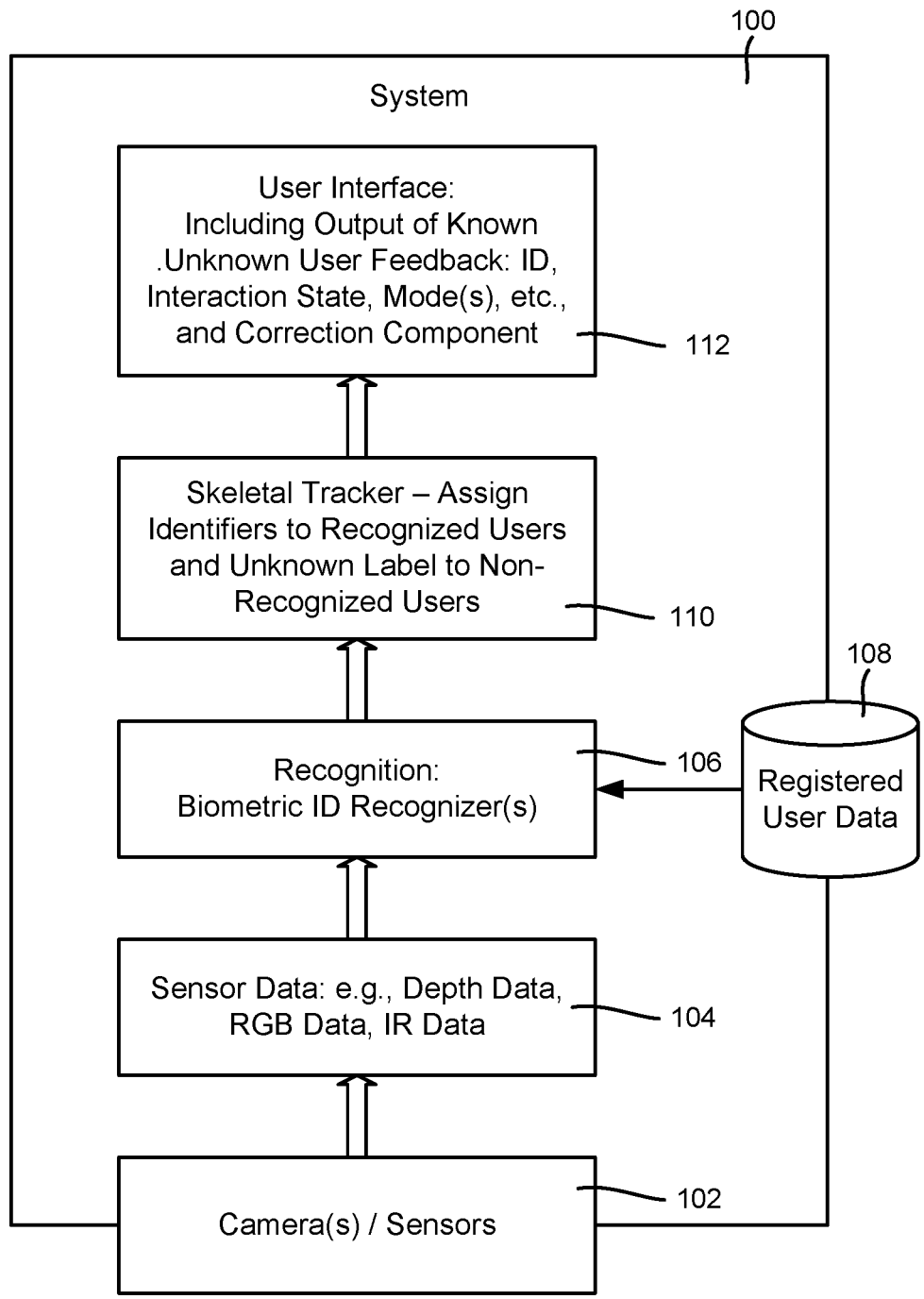
FIG. 1 is a block diagram illustrating example components that may be used in providing feedback to one or more users of a multi-user system with biometric recognition capabilities, in which the feedback is indicative of users' recognized identities and engagement states, according to one or more example implementations.

One or more aspects of the technology described herein are directed towards a dynamic multi-user system having biometric identification capability, in which the system provides feedback to users as to each user identity currently recognized by and registered in the system. Via the feedback, a user can correlate his or her biometrically recognized identity and state of user engagement with the system against his or her actual identity (and possibly engagement state), and thereby know whether the system is acting correctly for the correct user. The system feedback thus provides information to the users that they are recognized by the system correctly (or incorrectly). In a multi-user system using biometric identification, users thus may be confident that the system has recognized them correctly, as part of the interaction model(s), including as dynamic re-recognition occurs. Misrecognition or other system errors may be remedied before any undesirable consequential user actions occur.

To this end, one or more aspects are directed towards providing feedback to the user on what the camera sees. For example, if a camera is placed near the television, facing a living room, the camera generally will see all users in the living room. Showing a live view of this camera feed provides direct feedback to the user or users of what the system can see at a given moment.

Another aspect highlights each user in the camera feed. For example, instead of showing a live video of the camera view, the system may independently show each user in the camera. Alternatively, the system may show a live video of the users in a way that differentiates each user in the live video. This may be done in a variety of ways, including drawing a box around each user, putting an indicator near each user, or displaying other such elements in the user interface indicating that there is a person visible to and understood by the system to be a person (and not another entity such as an object, for example).

Another aspect is directed towards showing that a given person seen by the camera is recognized as a particular user registered on the system. This can be done by indicating (e.g., via a display of the user's name and/or associated image) that a particular person in the camera view is recognized as a specific user identity. Multiple users may be independently identified. A user understood by the system to be a person, but who is not registered on the system, may be identified as an "unknown" person or the like.

Once a person in the camera view is visibly correlated to a user registered on the system, many supplementary correlations can be displayed. One example is highlighting or otherwise visibly indicating user representations in order to indicate that they have been biometrically recognized. Another example may be that a person is biometrically recognized and authenticated with the system (they now have access to launch applications, access documents, communicate with others, etc).

Another example may be that users are biometrically recognized and currently interacting with the system via different input methods. As some examples, a user may be highlighted in one way if he or she is interacting with a controller, another way if he or she is interacting via voice commands, yet another way if he or she is interacting with gestures, and still another way if he or she is interacting remotely such as through a phone or tablet.

In some implementations, only one user may enter operating system control-type commands at a time (these are not game-playing or other multi-user commands, which multiple users may enter simultaneously). In such command-and-control scenarios, the person currently interacting may retain the ability to solely interact until interaction stops, at which time another user may drive input. Note that driving the system with operating system control-type commands may be extended to more than one user, with some tiebreaking scheme used for scenarios where conflicting commands are entered. Thus command input directed to system operation or initial game setup may be different from other input, such as application input where multiple users may interact to play a game or otherwise provide input at the same time.

The system may recognize and emphasize one of the users as being the user who the system has designated as having focus (or some similar priority), e.g., only the input (e.g., gestures and/or speech) of the user having focus may be accepted by the system, such as in command-and-control scenarios. With respect to focus, in general, if only one person is interacting, that person gets focus and active input ability. With respect to focus when no one is driving the system or when multiple users are attempting to drive the system (and not all can do so at once), a user may retain focus.

In some implementations a user may still retain focus for future interactions. For example, a user who has focus may have to take some action to relinquish focus to another user, such as perform a certain gesture, speak a particular spoken command, enter a controller command, leave the camera view, or take some other suitable action. Instead of having a user retain focus until relinquished, a tiebreaker system may be used if multiple people are attempting to drive UI input, (such as in command and control scenarios where conflicting input may be received). Tiebreaking schemes may be via a hierarchy mechanism (e.g., parent over child), or by timing, e.g., the focus switches to the most recent user attempting to interact. Further, focus change may be attained by some override mechanism, e.g., in case the system continues to give focus to a user that is no longer present. For purposes of exemplifying feedback, focus is generally not described hereinafter except where otherwise noted; instead, some of the exemplified feedback indicates which user, if any, is actively driving the system.

It should be understood that any of the examples herein are non-limiting. For example, the technology is generally described in the context of an entertainment console/gaming system, however other devices such as a personal computer, smart television or monitor, tablet, smartphone and so forth in which one or more users may want to confirm that they have been correctly biometrically recognized may benefit from the technology described herein. Similarly, it is understood that numerous ways to provide feedback other than via the example display mechanisms and techniques exemplified herein may be used, such as including but not limited to alternative graphics, animations, video, audio and/or tactile feedback. Examples with multiple simultaneous users are shown, but it is understood that a single user may benefit by knowing he or she is properly recognized with the correct identity by the system. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing, automated recognition and feedback in general.

FIG. 1 shows a generalized block diagram in which a system 100 incorporates or is coupled to sensors 102 that provide data 104 to a biometric recognition system 106. The data may be infrared image data, depth data (obtained via stereo matching or time-of-flight, for example) and/or color image (e.g., RGB) data, for example. Other sensor-provided data such as voice data may be made available to the recognition system 106 by the camera(s)/sensor(s) 102.

Based upon stored registered user data 108, which may be locally and/or remotely maintained (e.g., in the cloud), previously registered users may be recognized via biometric identification as an identity already registered with the system. Any biometric technology may be used, e.g., facial recognition, eye scanning, voice recognition (if the user speaks) and so on. Some types of biometric identification such as facial recognition do not necessitate any action by the user other than to be generally facing the camera at some point.

The identity may be mapped to skeletal tracking 110 as associated data for each person the system detects and recognizes. This allows user interface 112 to provide the feedback that corresponds to identity, including as the user moves around, as well as to detect one or more various modes a user may be in; (e.g., actively driving the system is one such mode, which for example can be determined by detecting gestures via skeletal tracking). Another mode is "signed in" to the system. Signing in may be automatic upon recognition, although as described herein, a user may be recognized but not signed in some implementations.

As described herein, the user interface 112 also includes a correction component. User interaction with the correction component facilitates correction of misrecognition, including when a user is recognized as someone else, is not recognized as a registered user, and so on. In one or more implementations, the user interface also may provide other identity-related interaction capabilities, such as for manually signing in or out, and so forth.

Figure 2:
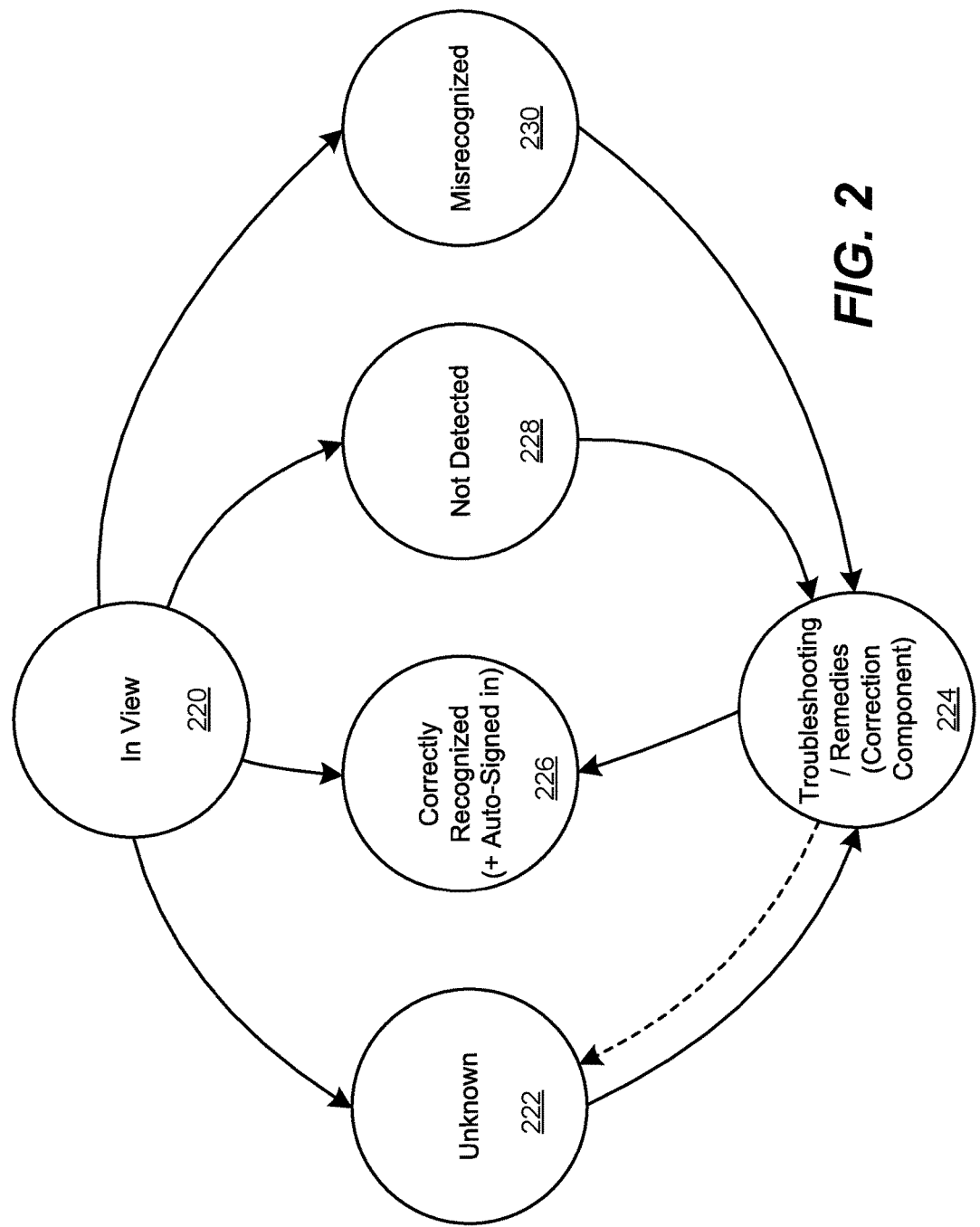
FIG. 2 is a state diagram illustrating example states and transitions with respect to how a system may recognize users, according to one or more example implementations.

FIG. 2 shows some possible states as to how a system may consider a person when that person is present in a camera-based recognition system, starting when a person is in view (state 220). Note that FIG. 2 shows only some example states, and that not all possible states are shown; as some examples of other states, there may be a state in which a person is out of view but still signed into the system, a state in which a person is recognized but not signed in, a state when a given person has focus, and so on.

One state represented in FIG. 2 is an unknown state 222, in which the system detects that a person is present, but is not able to recognize that person. This may be because that person is not registered in the system, because the person's face is obscured (in a facial recognition-based biometric system), and so on. Feedback may be used to indicate that the person is unknown, whereby that person can take some remedial action (e.g., troubleshooting may be invoked) to become recognized. Troubleshooting/remedial action is shown in FIG. 2 as a "state" 224 (although not necessarily a state in a conventional sense), which may be as simple as instructing the person to face the camera, or to ask the person to initially register or re-register (e.g., the face is well seen, but simply not recognized). Troubleshooting/remedial action is generally not described herein, except to note that it may be invoked as desired to correct a system misrecognition or other error, and/or enter a person into a recognized state.

Another state in FIG. 2 is correctly recognized (state 226). This may include automatically signing the person into the system, whereby that person can thereafter interact with the system as his or her own self. Note that it is feasible for a person to act as another person, (e.g., person A rents the movie and pays for it, but it gets loaded onto person B's console). Biometric sensing may be overridden via manual signing in, for example.

Another state shown in FIG. 2 is a "not detected" state 228. For example, a person may not be identified as being a person for whatever reason, including being out of camera view, or positioned in such a way that the person is not distinguishable from furniture or the background, for example. In such a situation, the absence of feedback may be an indicator that the user is not being recognized as a person. The user may move or otherwise perform troubleshooting to become recognized and/or registered, or at least to be understood by the system as being an unknown person.

A significant state that part of the feedback helps to eliminate is a misrecognized state, shown in FIG. 2 as state 230. As described above, misrecognition may have undesirable consequences, and thus the feedback is directed (at least in part) to helping users detect and exit this state.

Figure 3:
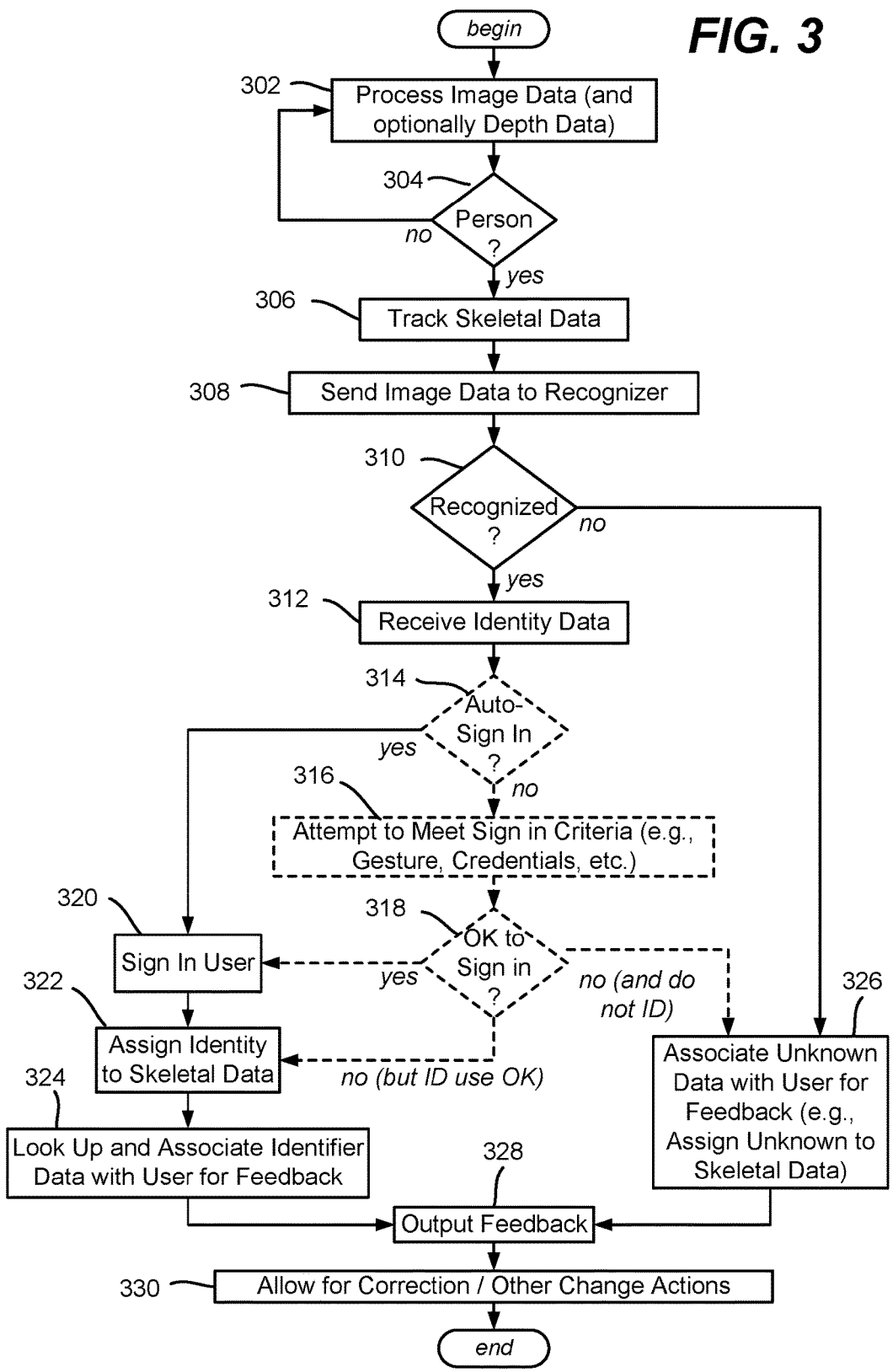
FIG. 3 is a flow diagram representing example steps directed towards providing relevant identity-related feedback to users in a multi-user system with biometric recognition capabilities, according to one or more example implementations.

FIG. 3 is a flow diagram showing example steps to provide correlated feedback as described herein in an image-based biometric system, beginning at steps 302 and 304 where sensor data (e.g., image data/depth data) is processed to find a person (or persons) in the image. For each person, skeletal data may be tracked, as shown via step 306. Note that face tracking, voice tracking and so on may be an alternative to skeletal tracking, or be used in conjunction with skeletal tracking. Note that FIG. 3 may be performed per-person, parts of which may be performed in parallel for multiple persons.

Step 308 sends the image data (or other biometric data in alternative implementations) for recognition; for example, this may be only the portion of the image that contains a person's face. Step 310 represents attempting to recognize this person by accessing a data store of registered persons. If not matched to a person, step 310 branches to step 326 where the person is considered unknown (and, for example, an unknown identity may be assigned to that person's skeletal data). Note that in alternative implementations, an unknown person may be signed in (or allowed to sign in) as a guest or the like; in this way a casual acquaintance need not have to register to have some limited "sign-in" type rights, for example.

If a person is matched to an identity in the data store, the identity data is received at step 312. This received identity data may include a system-unique identifier, which may be used as a key to look up (step 324) personalized data (e.g., a custom icon that represents the user), or may include the personalized data directly.

In one or more implementations, automatic sign in may occur, as represented by optional (dashed) step 314 automatically "branching" to step 320. However, as mentioned above, in one or more alternative implementations, a state in which a user is recognized by the system but not automatically signed in may exist. For example, a user may specify that even if recognized, a password is needed before signing in. As another example, a system may be set up to only attempt recognition after some time in view, e.g., a transient user passing through a room may not be recognized and/or automatically signed in, whereas a user in view for some time (e.g., five seconds) may be recognized and signed in. As another example, a certain sign in gesture may need to be used.

Any of these criteria or one or more other criteria, alone or in combination, may result in optional step 316 being performed to perform some additional sign-in action or actions other than automatic signing in. Step 316 thus represents situations in which credential entry may be needed, a particular gesture may be needed, a minimum time in view may be needed, and so on, before sign in can occur.

Step 318 represents whether it is OK to sign in the user based upon any needed sign-in criterion or criteria being met at step 316. If so, step 318 branches to step 320 to sign in the recognized, registered user upon meeting the one or more user criteria (actions) at step 318.

In the example of FIG. 3, step 318 also represents another option, by which a user may indicate that sign in is not desired, but the system may use the user's identity as needed (step 322) without being signed in for interaction, versus not using the identity at all (step 324). For example, one registered user may simply want to check that the system properly recognizes him or her, but not sign in for interaction, such as when credentials are requested but not provided. Another user may be recognized, but wish to remain identified as unknown, such as if the display is being shared to remotely-located persons. For such an option, some gesture, speech, controller or other input may be used by step 318 to distinguish between these alternatives. Note that if the exemplified "ID use OK" option is not present in an alternative similar to step 318, or is present but the user does not want his or her identity used, then step 318 branches to step 326 where the person is treated as unknown, even though recognized by the system as having a registered identity.

Thus, a not-recognized person or one that does not want to be identified may be labeled as "unknown" by the system (step 326). A user may want to be identified as present, but not signed in, in which case the feedback is directed to such a state (e.g., via step 318 branching to step 322).

Step 322 presents assigning a user identifier to the skeletal data (if skeletal tracking is in use). Step 324 representing looking up feedback-related data (e.g., personalized visible data such as an icon or flag) for this user and associating it with the user. As described herein, this feedback allows a user to know whether the system has correctly recognized him or her, as well as possibly conveying other state data, such as whether the user is driving the system, how the user is interacting, and so on.

Step 328 represents outputting the feedback, e.g., to the user interface display in a way that is consistent with what the user interface is currently displaying; (FIGS. 5-8 provide some possible examples of displayed feedback).

Step 330 allows for troubleshooting or other change actions (e.g., remedial actions), which is particularly useful for users who are misrecognized, or not recognized but want to be. Similarly, a user may want to change from being recognized but not signed in to being signed in, or to change from being listed as "unknown" (even though recognized) to being recognized, or to being recognized and signed in. A signed in person may want to sign out, and/or a recognized person may change to unknown. An unknown person may want to register. In general, step 330 allows for overriding or changing any state into which the system (or the person) has currently placed a person.

Figure 4A:
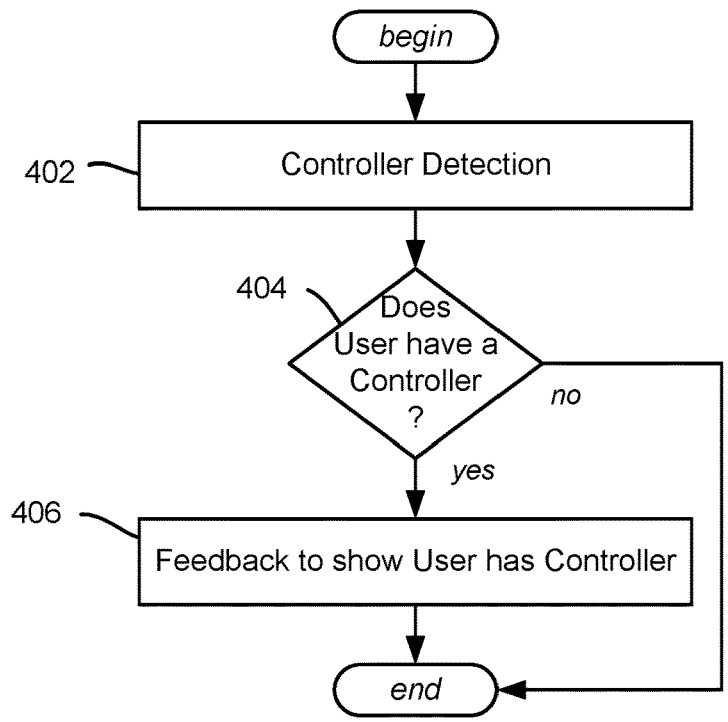
FIG. 4A is a flow diagram representing example steps directed towards providing interaction-related feedback to a user indicative of possession of a controller, according to one or more example implementations.
Figure 4B:
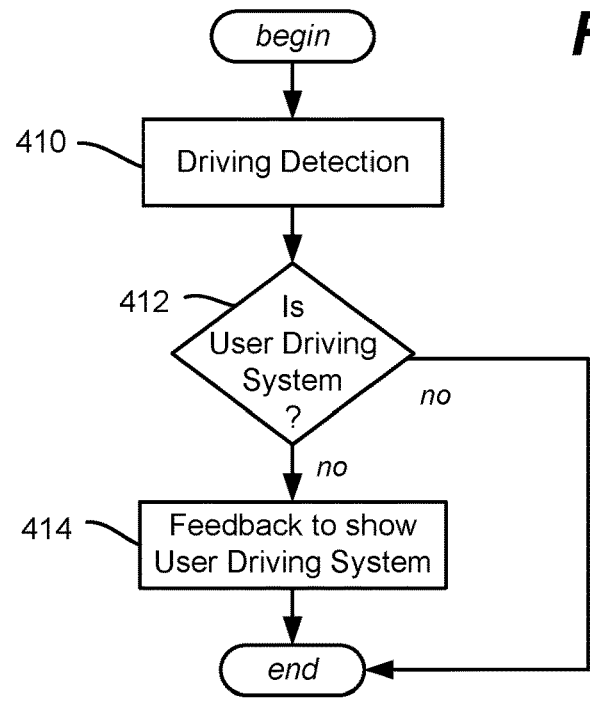
FIG. 4B is a flow diagram representing example steps directed towards providing interaction-related feedback to a user to indicate when the user is driving the system, according to one or more example implementations.

FIGS. 4A and 4B represent some additional modes that the system may recognize and provide as feedback. FIG. 4A is related to controller detection 402, and is directed to whether the user is currently possessing a controller (step 404), which may be sensed by the system. If so, at step 406, feedback may indicate such possession. As can be readily appreciated, other types of input may be similarly detected and result in corresponding feedback, e.g., whether a user is interacting via gestures, speech, or interacting remotely are examples of interaction that may result in such feedback.

FIG. 4B is directed to whether a user is currently driving the system, (or possibly has focus if no one is currently driving the system), shown as driving detection 410. If so (step 412), feedback via step 414 may be used, such as to change the way the user's representation (e.g., a tile) appears on a display, for example.

Feedback includes any of various information that may be communicated, such as who the system sees as a person, who the system recognizes/maps to a registered identity, who is driving the system (or possibly who has focus), as well as other modes, e.g., whether the person has a game controller. Feedback may be communicated in many different visual ways, e.g., via highlighting, color, flashing, labeling, putting a shape around a representation of a person (e.g., a box), animations, video and so forth, as well as other ways, e.g., playing audio such as a custom melody or speaking a name, buzzing a controller, possibly with a particular vibration pattern and/or intensity, and so forth.

Some of the many possible non-limiting examples of feedback are exemplified in FIGS. 5-8. For purposes of brevity and illustration, only visual examples are used. Some of the examples show which profiles are currently recognized via an identity and are signed in, versus unknown persons, as well as which user is driving the system. However, it is understood that other states, including which persons are currently seen, which persons are registered but not seen, what type of input (speech, controller, gesture, etc.), if any, is being received, and so on may be presented as feedback.

Almost any desired state (including modes) and transitions may be detected and used to provide feedback to users. For example, a user who has just been recognized/is being signed in may have his or her tile highlighted in some way (e.g., brightened temporally or otherwise animated visually) to indicate he or she has just joined the system.

Figure 5:
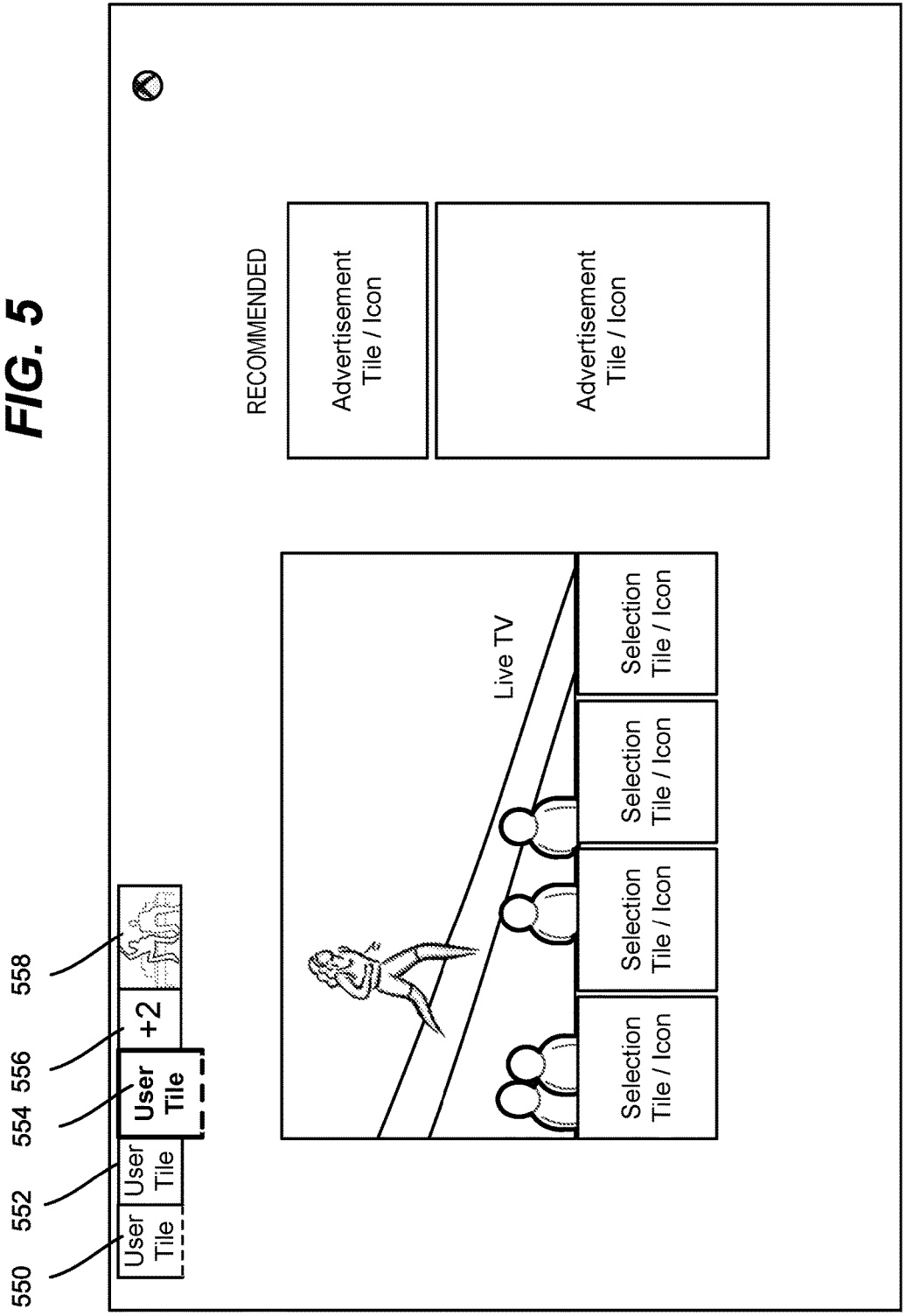
FIG. 5 is an example representation of a system display including rendered feedback in the form of icons/tiles that contain information indicative of user identity data, according to one or more example implementations.
Figure 6:
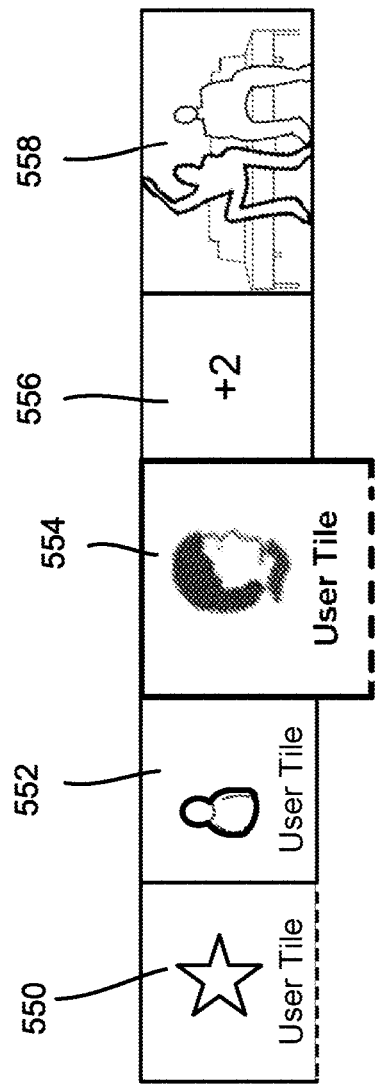
FIG. 6 is an example representation (generally corresponding to an enlarged portion of FIG. 5) exemplifying icons/tiles and data therein that contain information indicative of user identity data and state information, according to one or more example implementations.

FIG. 5, part of which is enlarged in FIG. 6, exemplifies who is identified as a registered user, via feedback in tiles/icons 550, 552 and 554. This feedback may be presented anywhere on the display, but in the example implementation of FIG. 5, the feedback is displayed in the upper left corner of the display to provide display space for showing video (e.g., live television, game play, recorded video or the like), as well as possibly advertisements, and so on. Note that to represent an identity, actual faces, cartoon-like character icons, a photograph or similar image, avatars, text and/or the like may be displayed in such a tile. For example, one person may choose (e.g., during registration) to be represented by an actual or cartoon-like "fox" image to represent his or her user account. Other users may be represented by other pictures, which may be an actual image of a user, or possibly a video and/or animation, with a text label also possible, among many possible examples.

In FIGS. 5 and 6, in the provided feedback, one person's tile representation 554 is larger (and brighter, represented by bolding) than the other tiles 550 and 552. (Note that enlarged FIG. 6 shows example images in the user tiles 550 and 552 and 554, while for space reasons FIG. 5 does not.) The larger and brighter tile 554 is indicating who is driving input (or possibly who has focus). Further, the tiles 550 and 554 (but not the tile 552) each include a visible bar (e.g., colored in some implementations, as represented by a dashed line at the bottom of the tile) to indicate current presence in the camera's view. Note that FIG. 7 shows similar but alternative feedback, in that in FIG. 7, the tile representation 754 of the user driving input does not have a larger tile/image, only a "brighter" one (bolded in FIG. 7).

In FIGS. 5 and 6, the indicator "+2" labeled 556 may indicate a number of people who were recognized but are no longer in view, and/or may be used to represent when too many people are in the view to display feedback for everyone.

As additional feedback, a colorized depth representation (image) 558 of what the camera sees depth-wise may be provided, with the more brightly highlighted (or in this example bolded) person's depth "shape" corresponding to who is actively driving the system (or possibly who has focus).

Figure 7:
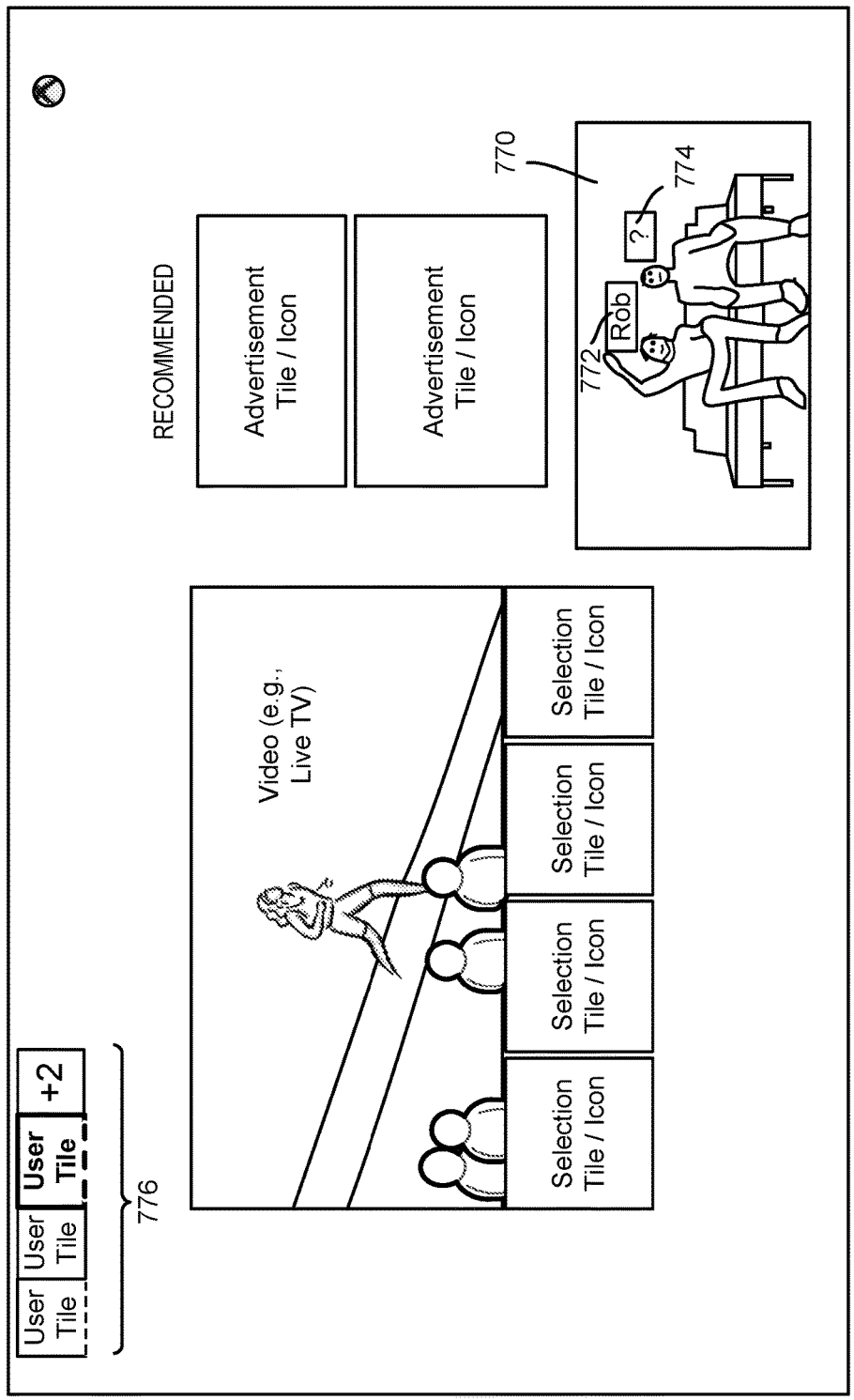
FIG. 7 is an example representation of a system display including a camera view representation that provides feedback, according to one or more example implementations.

FIG. 7 shows another feedback example, in which a visible light camera (e.g., RGB or monochrome) image 770 of the current camera view is shown; this may be a live view at full frame rate, or at a sampled rate. In this example, one user is recognized, and that user is labeled, e.g., with his name ("Rob") hovering over his image via a flag 772 or the like. An unknown person need not be labeled, or alternatively may be labeled as recognized as being a person but not known to the system, as shown via a "?" label 774 in FIG. 7. A label may be superimposed on or near the associated person in the image, or may be adjacent the image and include a caption/bubble with a pointing mechanism to the associated person. Note that the feedback tiles 776 in the upper left corner in the example of FIG. 7 do not include a depth image, however this is only one example, and a depth image may be displayed on the same user interface display as a visible light camera image.

Figure 8:
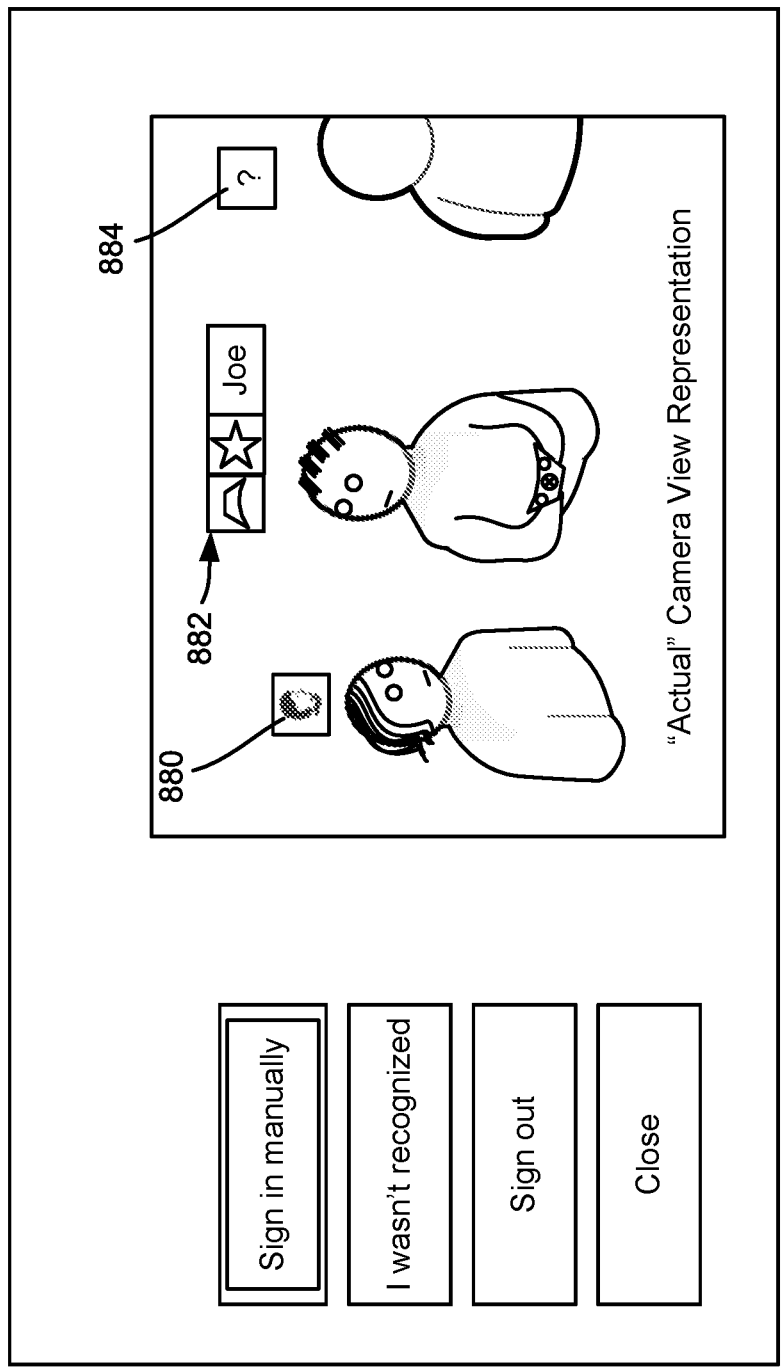
FIG. 8 is an example representation of a system display including an alternative camera view representation that provides feedback and user interaction controls, according to one or more example implementations.

FIG. 8 shows a representation (which may be an actual visible light camera image with feedback superimposed thereon) in which two users are currently recognized and signed in, as represented by the icon 880 and icon set 882 superimposed over each such user. The icon set 882 includes the person's name to indicate who is driving input, and a controller logo to indicate that the person possesses a controller. The person corresponding to the icon 880 knows that he is recognized, because the icon 880 above her image is the one the user knows represents her. The other person is detected as a person but not recognized, as indicated by the unknown question mark "?" icon 884 above his or her image. Note that any other person in the picture is not even detected as present, whereby the feedback is the absence of any associated icon or the like.

FIG. 8 also shows some example troubleshooting options that may be taken, e.g., by the correction component of the user interface 112. The example of FIG. 8 includes an "I wasn't recognized" option, which may be used when not recognized at all as well as for other misrecognition scenarios.

As can be seen, there is provided technology for indicating to each user his or her current state with respect to a system that includes biometric recognition. This may be by visual feedback, such as in some of the examples. Various state data may be conveyed, particularly state data that allows a person to know whether he or she is correctly or incorrectly recognized. Other state data such as a signed in (or not) state, interaction mode, and so forth may be output.

For example, in some aspects relatively small tiles may be used to convey the feedback. In other aspects, a robust visible camera view allows users to more easily identify themselves, e.g., in an actual display of the camera view itself, a flag or the like may be displayed above the person's head with their name on it and possibly other information. This indicates that the system recognizes the particular person in the camera view as a particular user. At such a time, the camera view takes up more space on the display screen (relative to when the display is being used for more conventional viewing and interaction) in order to display this level of detail, however this provides more direct feedback to the user that they are recognized as the correct person.

This may be accomplished via one or more aspects directed towards receiving identity data corresponding to recognition of a user as determined by biometric recognition, and associating the identity data with the user. Based upon the identity data, feedback is output (to an output device) that indicates that a recognized identity is associated with the user, including feedback that indicates that the user is capable of interacting with a system that is coupled to or incorporates the output device.

In one or more aspects, the user may be automatically signed into the system based upon the identity data. Facial recognition is one type of biometric recognition that may be used to obtain the identity data. The identity data associated with the user may be changed to different identity data based upon user interaction.

Outputting the feedback may comprise providing a visual indication representative of the recognized identity, in which the visual indication comprises an image, an icon, text, an animation and/or a video. For example, a camera view may capture images of the user, and outputting the feedback may comprise outputting a visible image of the camera view and the feedback. Outputting the feedback may comprise superimposing at least one visual indication above the visible image and/or adjacent the visible image. The visible image may comprise a depth image and/or a visible image.

Other feedback may be output. For example, upon determining that the user has a controller, additional feedback may be output to indicate the user has the controller. Upon determining that the user is driving a system. Feedback may be output that indicates the user is driving the system.

One or more aspects are directed towards a user interface component configured to receive identification data of one or more biometrically recognized users. For each biometrically recognized user, the user interface component outputs feedback, including feedback indicative of an identity of that user based upon the identification data, and feedback indicative of an interaction state of the user.

The feedback may be superimposed over or adjacent a visible image representative of at least one recognized user, and/or may comprise one or more icons representative of at least one recognized user. Non-limiting examples of feedback representing the interaction state of the user may indicate a sign in state, an in-view state, a current system driving state and/or a having focus state. Other example feedback may indicate a user's current (or capabilities with respect to) input method(s) for system interaction, such as controller input, speech input, gesture input, and/or remote input.

In one or more aspects, the user interface component may include a correction component that allows an incorrectly recognized user to change the identity that is associated with the incorrectly recognized user. The user interface component also may receive data that indicates that a person is detected but is unrecognized, and may output feedback indicative of an unrecognized state associated with that person.

One or more aspects are directed towards processing an image for detection and biometric recognition of one or more persons therein to attempt to recognize each person. A recognized person has identity data associated therewith, and is signed into a system based on the identity data. Feedback data is also obtained based upon the identity data, including feedback data for rendering as a visible representation of the recognized person. The feedback data is output for rendering as a visible representation of the recognized person on a display device coupled to or incorporated into the system, including rendering feedback data that indicates the recognized person is signed into the system.

Signing the recognized person into the system may be automatically performed upon biometric recognition of the recognized person. Also described is tracking skeletal data of the recognized person; associating the identity data with the recognized person in the image may comprise associating the identity data with the skeletal data of the recognized person.

Example Operating Environment

It can be readily appreciated that the above-described implementation and its alternatives may be implemented on any suitable computing device, including a gaming system, personal computer, tablet, DVR, set-top box, smartphone and/or the like. Combinations of such devices are also feasible when multiple such devices are linked together. For purposes of description, a gaming (including media) system is described as one exemplary operating environment hereinafter.

Figure 9:
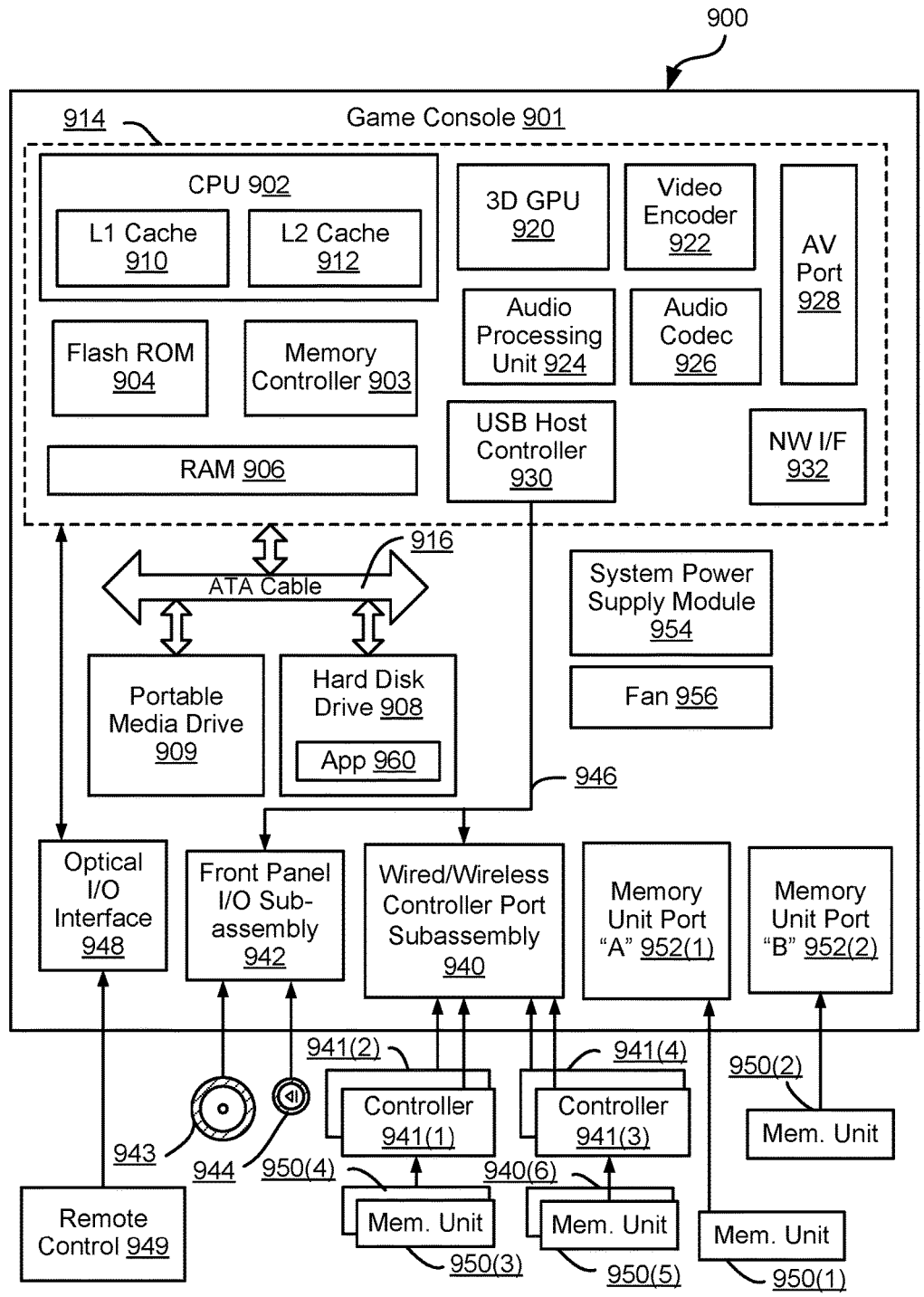
FIG. 9 is a block diagram representing an example non-limiting computing system or operating environment into which one or more aspects of various embodiments described herein can be implemented.

FIG. 9 is a functional block diagram of an example gaming and media system 900 and shows functional components in more detail. Console 901 has a central processing unit (CPU) 902, and a memory controller 903 that facilitates processor access to various types of memory, including a flash Read Only Memory (ROM) 904, a Random Access Memory (RAM) 906, a hard disk drive 908, and portable media drive 909. In one implementation, the CPU 902 includes a level 1 cache 910, and a level 2 cache 912 to temporarily store data and hence reduce the number of memory access cycles made to the hard drive, thereby improving processing speed and throughput.

The CPU 902, the memory controller 903, and various memory devices are interconnected via one or more buses (not shown). The details of the bus that is used in this implementation are not particularly relevant to understanding the subject matter of interest being discussed herein. However, it will be understood that such a bus may include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, the CPU 902, the memory controller 903, the ROM 904, and the RAM 906 are integrated onto a common module 914. In this implementation, the ROM 904 is configured as a flash ROM that is connected to the memory controller 903 via a Peripheral Component Interconnect (PCI) bus or the like and a ROM bus or the like (neither of which are shown). The RAM 906 may be configured as multiple Double Data Rate Synchronous Dynamic RAM (DDR SDRAM) modules that are independently controlled by the memory controller 903 via separate buses (not shown). The hard disk drive 908 and the portable media drive 909 are shown connected to the memory controller 903 via the PCI bus and an AT Attachment (ATA) bus 916. However, in other implementations, dedicated data bus structures of different types can also be applied in the alternative.

A three-dimensional graphics processing unit 920 and a video encoder 922 form a video processing pipeline for high speed and high resolution (e.g., High Definition) graphics processing. Data are carried from the graphics processing unit 920 to the video encoder 922 via a digital video bus (not shown). An audio processing unit 924 and an audio codec (coder/decoder) 926 form a corresponding audio processing pipeline for multi-channel audio processing of various digital audio formats. Audio data are carried between the audio processing unit 924 and the audio codec 926 via a communication link (not shown). The video and audio processing pipelines output data to an A/V (audio/video) port 928 for transmission to a television or other display/speakers. In the illustrated implementation, the video and audio processing components 920, 922, 924, 926 and 928 are mounted on the module 914.

FIG. 9 shows the module 914 including a USB host controller 930 and a network interface (NW I/F) 932, which may include wired and/or wireless components. The USB host controller 930 is shown in communication with the CPU 902 and the memory controller 903 via a bus (e.g., PCI bus) and serves as host for peripheral controllers 934. The network interface 932 provides access to a network (e.g., Internet, home network, etc.) and may be any of a wide variety of various wire or wireless interface components including an Ethernet card or interface module, a modem, a Bluetooth module, a cable modem, and the like.

In the example implementation depicted in FIG. 9, the console 901 includes a controller support subassembly 940, for supporting four game controllers 941(1)-941(4). The controller support subassembly 940 includes any hardware and software components needed to support wired and/or wireless operation with an external control device, such as for example, a media and game controller. A front panel I/O subassembly 942 supports the multiple functionalities of a power button 943, an eject button 944, as well as any other buttons and any LEDs (light emitting diodes) or other indicators exposed on the outer surface of the console 901. The subassemblies 940 and 942 are in communication with the module 914 via one or more cable assemblies 946 or the like. In other implementations, the console 901 can include additional controller subassemblies. The illustrated implementation also shows an optical I/O interface 948 that is configured to send and receive signals (e.g., from a remote control 949) that can be communicated to the module 914.

Memory units (MUs) 950(1) and 950(2) are illustrated as being connectable to MU ports "A" 952(1) and "B" 952(2), respectively. Each MU 950 offers additional storage on which games, game parameters, and other data may be stored. In some implementations, the other data can include one or more of a digital game component, an executable gaming application, an instruction set for expanding a gaming application, and a media file. When inserted into the console 901, each MU 950 can be accessed by the memory controller 903.

A system power supply module 954 provides power to the components of the gaming system 900. A fan 956 cools the circuitry within the console 901.

An application 960 comprising machine (e.g., computer-executable) instructions/logic is typically stored on the hard disk drive 908. When the console 901 is powered on, various portions of the application 960 are loaded into the RAM 906, and/or the caches 910 and 912, for execution on the CPU 902. In general, the application 960 can include one or more program modules for performing various display functions, such as controlling dialog screens for presentation on a display (e.g., high definition monitor), controlling transactions based on user inputs and controlling data transmission and reception between the console 901 and externally connected devices.

The gaming system 900 may be operated as a standalone system by connecting the system to high definition monitor, a television, a video projector, or other display device. In this standalone mode, the gaming system 900 enables one or more players to play games, or enjoy digital media, e.g., by watching movies, or listening to music. However, with the integration of broadband connectivity made available through the network interface 932, gaming system 900 may further be operated as a participating component in a larger network gaming community or system.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method comprising:
receiving depth data in images of a first user captured by a depth camera;
performing skeletal tracking of the first user using, at least in part, the depth data;
recognizing an identity of the first user based on the skeletal tracking; and
outputting feedback to an output device, the feedback based on the identity of the first user and comprising:
a visible image that indicates that a recognized identity is associated with the first user, and
a visible indication of the first user in the visible image of the camera to indicate the first user has been recognized and is in focus to interact with the system, the indication modifying representation of the first user as captured in the camera view using the depth data.

2. The method of claim 1, wherein the representation of the first user being modified comprises a live video view associated with the first user.

3. The method of claim 1, further comprising automatically signing the first user into the system upon recognition of the identity of the first user based on the skeletal tracking.

4. The method of claim 1, wherein the visible indication of the first user in the visible image comprises highlighting a portion of the first user in the visible image.

5. The method of claim 1, wherein said visible indication of the first user in the visible image comprises blinking a portion of the first user in the visible image.

6. The method of claim 1, further comprising presenting on a second output device to a second user an indication that the first user is in focus.

7. The method of claim 1, further comprising:
detecting a gesture of the first user in focus; and
interacting with the system based on the detected gesture of the first user in focus.

8. The method of claim 7, wherein said interacting with the system comprises providing feedback to the first user.

9. The method of claim 7, wherein said interacting with the system comprises providing feedback to other users on separate output devices.

10. The method of claim 1 wherein said outputting the feedback comprises outputting a camera view of the first user and the visible indication, the visible image comprising a depth image.

11. The method of claim 1, wherein the visible indication comprises text presented in association with the first user.

12. The method of claim 1 further comprising determining whether the first user has a controller, and if so, outputting additional feedback to indicate the first user has the controller.

13. The method of claim 1 further comprising:
receiving audio related to a second user; and
switching focus from the first user to the second user based, at least in part, on the received audio related to the second user.

14. A system comprising:
memory accessible to at least one processor configured for:
receiving depth data in images of a first user captured by a depth camera;
performing skeletal tracking of the first user using the depth data;
recognizing an identity of the first user based on the skeletal tracking; and
outputting feedback to an output device, the feedback based on the identity of the first user and comprising:
a visible image that indicates that a recognized identity is associated with the first user, and
a visible indication of the first user in the visible image of the camera to indicate the first user has been recognized and is in focus to interact with the system, the indication modifying representation of the first user as captured in the camera view using the depth data.

15. The system of claim 14 wherein the at least one processor is further configured for outputting interaction feedback indicative of an interaction state of the first user in focus through indicating at least one of: a sign in state, an in-view state, or a current system driving state.

16. The system of claim 14, wherein the representation of the first user being modified comprises a live video view associated with the first user.

17. The system of claim 14, wherein recognition of the first user is performed based on skeletal tracking, gesture recognition, or audio recognition of the first user.

18. The system of claim 14, wherein the at least one processor is further configured for transmitting over a network to a second user an indication that the first user is in focus.

19. One or more machine-readable storage devices having executable instructions, which when executed perform operations comprising:
receiving depth data in images of a first user captured by a depth camera;
performing skeletal tracking of the first user using, at least in part, the depth data;
recognizing an identity of the first user based on the skeletal tracking; and
outputting feedback to an output device, the feedback based on the identity of the first user and comprising:
a visible image that indicates that a recognized identity is associated with the first user; and
a visible indication of the first user in the visible image of the camera to indicate the first user has been recognized and is in focus to interact with the system, the indication modifying representation of the first user as captured in the camera view using the depth data.

20. The one or more machine-readable storage devices of claim 19, further comprising transmitting over a network to a second user an indication that the first user is in focus.

* * * * *